E. G. MUNSON.
OULTIVATOR FENDER.
APPLICATION FILED APR. 19, 1906.
899,753.
Patented Sept. 29, 1908.
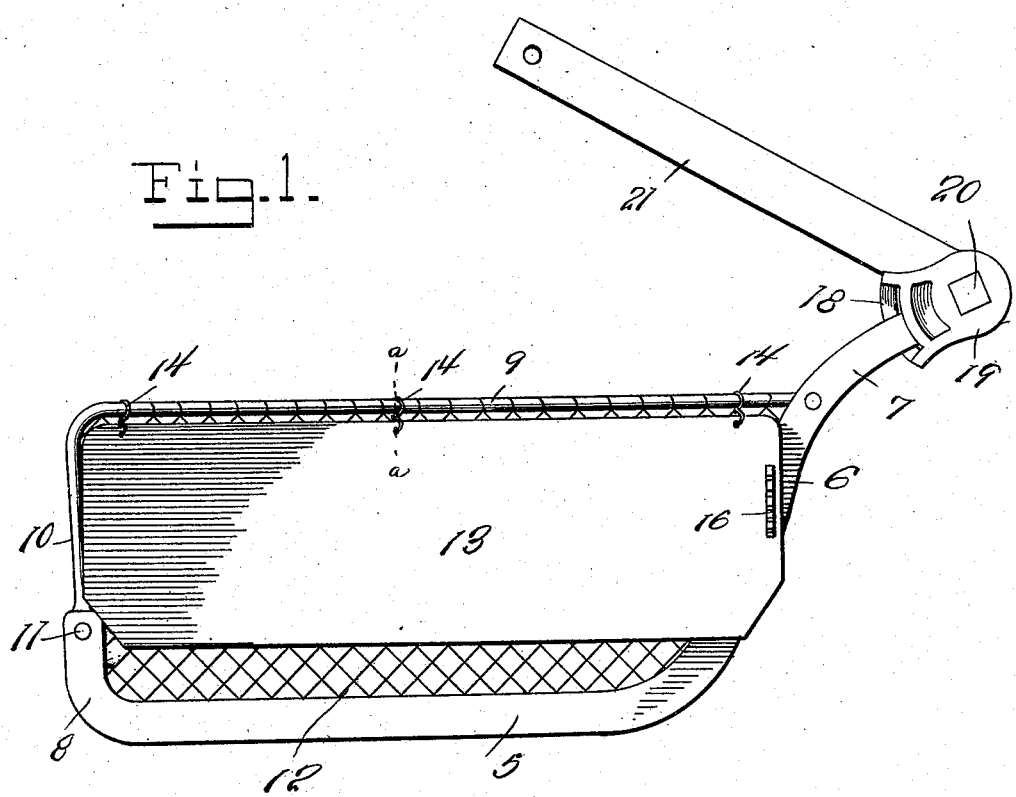
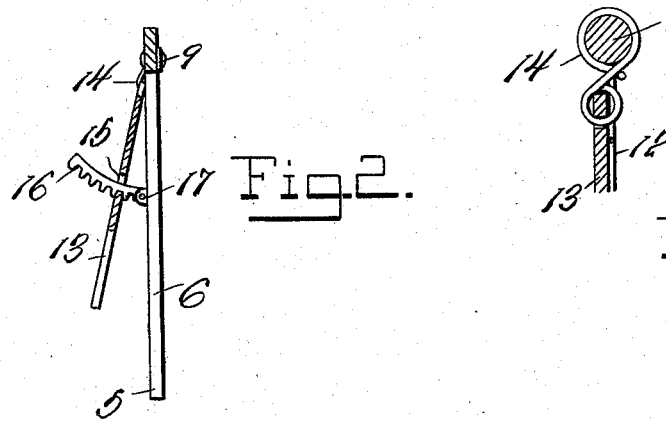
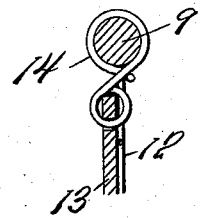
Witnesses
C. R. Thomas
H. B. MacNab.
Inventor
E. G. Munson
By Chandler & Chandler
Attorney
THE NORRIS PETERS CO., WASHINGTON, D. C.

UNITED STATES PATENT OFFICE.

ERNEST G. MUNSON, OF GARRETTSVILLE, OHIO.

CULTIVATOR-FENDER.

No. 899,753.

Specification of Letters Patent.

Patented Sept. 29, 1908.

Application filed April 19, 1906. Serial No. 312,682.

*To all whom it may concern:*

Be it known that I, ERNEST G. MUNSON, a citizen of the United States, residing at Garrettsville, in the county of Portage, State of Ohio, have invented certain new and useful Improvements in Cultivator-Fenders; and I do hereby declare the following to be a full, clear, and exact description of the invention, such as will enable others skilled in the art to which it appertains to make and use the same.

This invention relates to fenders for cultivators, and has for its object to provide a construction of this nature which will effectually prevent clods of dirt and stones from injuring young plants during cultivation of the soil.

The invention resides in the provision of a screen member having a shield detachably and adjustably connected therewith to regulate the screen surface to suit varying conditions of the soil.

With the above and other objects in view, the invention consists in the novel construction and arrangement of parts hereinafter fully described, shown in the accompanying drawings and particularly pointed out in the appended claims, it being understood that various changes in the form, proportion, size and minor details may be made within the scope of the claims without departing from the spirit or sacrificing any of the advantages of the invention.

In the drawings:—Figure 1 is a view in elevation of the invention. Fig. 2 is an end view thereof, partly in section and showing the means for holding the shield in adjusted position. Fig. 3 is a detail sectional view on the line *a—a* of Fig. 1.

Referring more specifically to the drawings, the fender includes a screen frame comprising a bar of metal which has one of its portions turned upwardly as at 6 and thence curved as at 7 and its opposite end portion turned upwardly as at 8. Secured in any suitable manner to the curved portion 7 is one end of a rod 9 which extends in parallel relation to the main portion of the bar 5 and has its opposite end turned downwardly as at 10 at right angles to its main portion and connected as at 11 with the extreme end of the upturned end portion 8 of the bar 5. Secured in any suitable manner and carried by the frame thus formed is a wire screen 12 which prevents clods of earth and stones from being thrown upon young plants and thereby injuring the same.

In order to regulate the passage of soil through the screen, I provide a shield which comprises a plate 13 preferably of sheet metal. For hingedly and detachably connecting the plate 13 of the frame, I provide upon the upper edge of the said plate a series of hook members 14 which are so bent as to snugly fit over the bar 9. The shield is of such size as to almost entirely cover the screen when it lies against the same and it will be readily understood that when the shield is swung away from the screen, the screen surface will be increased.

In order that the shield may be held at various angles with respect to the screen for the purpose just stated, I form through the shield, adjacent one end thereof, a slot 15 through which is engaged a segmental rack bar 16 which is pivoted to the portion 6 of the screen frame as at 17. It will be seen that when the shield has been moved to the desired position, the rack bar 16 will rest, by reason of its gravity, with one pair of its teeth upon opposite sides of the shield at the lower end of the slot 15 therein and that the said shield will thus be held in proper position until changed.

To connect the device with the cultivator, the end of the laterally turned portion of the member 5 of the frame is engaged through a curved slot in an offset yoke 18 formed upon one of a pair of clamping plates 19 and is received between the said plates, there being a bolt 20 engaged through the said plate and the said end of the portion 7. The bolt 20 is also engaged through one end of a bar 21 which is bolted at its opposite end to the frame of the cultivator, (not shown).

It will be apparent that the provision of the slot in the yoke 18 affords means whereby the fender frame may be raised away from the ground when so desired. In either its raised or its lowered position said frame is held against play by tightening the nut (not shown) which is threaded upon the bolt 20, such action resulting in a frictional binding of the parts.

What is claimed, is:—

A cultivator fender comprising a frame including a substantially U-shaped bar forming upturned extensions, one of the latter of greater length than the other and being curved laterally, a rod bent on itself at right angles thereto, the free ends of the same connected to the upturned extensions of said bar, and a screen mounted on the U-shaped bar and rod, a shield plate provided with a slot flexibly connected to the rod, a curved rack bar pivoted to one of the extensions and engaging the wall of the slot to adjust the shield plate at an angle to said frame and means for connecting the lateral portion of the extension to a cultivator.

In testimony whereof, I affix my signature, in presence of two witnesses.

ERNEST G. MUNSON.

Witnesses:
 ROSCOE J. WEBB,
 H. W. ALDEN.